(12) United States Patent
Ebert et al.

(10) Patent No.: US 7,901,467 B2
(45) Date of Patent: Mar. 8, 2011

(54) PROCESS FOR TREATMENT OF METAL SURFACES

(75) Inventors: Wolfgang Ebert, Krefeld (DE); Rainer Mellis, Baytown, TX (US); Alexander Meyer, Duesseldorf (DE); Bert Ruytinx, Halen (BE); Alexander Karbach, Krefeld (DE); Delef Michalski-Vollmer, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 793 days.

(21) Appl. No.: 11/977,598

(22) Filed: Oct. 25, 2007

(65) Prior Publication Data
US 2008/0210343 A1 Sep. 4, 2008

(30) Foreign Application Priority Data
Oct. 31, 2006 (DE) .......................... 10 2006 051 308

(51) Int. Cl.
*C13K 1/10* (2006.01)

(52) U.S. Cl. ...................................... 23/295 R; 148/287

(58) Field of Classification Search ................ 23/295 R, 23/298; 148/287
See application file for complete search history.

(56) References Cited

U.S. PATENT DOCUMENTS

| 4,518,440 | A | 5/1985 | Phillips, Jr. .............. 148/6.14 R |
| 5,087,660 | A | 2/1992 | Kunishi ........................ 524/611 |
| 6,485,607 | B1 | 11/2002 | Elsner et al. .................... 159/2.1 |
| 6,534,619 | B1 | 3/2003 | Elsner et al. ...................... 528/72 |
| 6,545,122 | B1 | 4/2003 | Elsner et al. .................. 528/503 |

FOREIGN PATENT DOCUMENTS

| EP | 1 156 071 B1 | 8/2004 |
| EP | 1 222 231 B1 | 1/2005 |
| EP | 1 607 202 A1 | 12/2005 |
| JP | 4-161210 | 6/1992 |
| JP | 7-171873 | 7/1995 |
| JP | 2002-126425 | 5/2002 |
| JP | 2003-48975 | 2/2003 |
| JP | 2003048975 | 2/2003 |

OTHER PUBLICATIONS

Surface and Interface Analysis, 36(3), (month unavailable) 2004, J.E. Castle and K. Asami, p. 220-224, "A more general method for ranking the enrichment of alloying element in passivation films".
Materials Science Forum vols. 185-188, (month unavailable) 1995, S. Virtanen and H. Böhni, p. 965-974, "On the stability of passive films on stainless steels".

*Primary Examiner* — Edward M Johnson
(74) *Attorney, Agent, or Firm* — Connolly Bove Lodge & Hutz LLP

(57) ABSTRACT

A process for treating the working surfaces of equipment used in the production and processing of polycarbonate is disclosed. The thermal treatment in an oxidative atmosphere results in resin and molded articles having improved optical quality.

10 Claims, No Drawings

PROCESS FOR TREATMENT OF METAL SURFACES

FIELD OF THE INVENTION

The present invention provides a process for the passivation of metal surfaces and in particular metals used in producing and processing of polycarbonates.

TECHNICAL BACKGROUND OF THE INVENTION

The metals in the context of the invention find use as "plant components" in e.g. optionally heated pipes for the transport of polycarbonate melts, tube bundles or the internal surfaces of heat exchangers, reaction vessels or filtration apparatus or other melt-conveying sections of extruders and pumps. The polycarbonate thus produced is especially suitable for high-quality injection molded articles, particularly those in which high transparency and a low YI (yellowness index) are important, such as e.g. optical data storage media, diffusers or panes for the automotive sector in general. The polycarbonate granules or injection moldings produced with the aid of these plant components have a low content of fluorescent particles.

The production of polycarbonate generally takes place in plant components, i.e. pipes, reaction vessels etc., made of steel or of special steel alloys. The polycarbonate is produced, transported, evaporated, isolated or further processed in equipment that includes these components.

It has now been found that metal surfaces that come into contact with polycarbonate melts can have a deleterious effect on product quality.

Thus, it has been found that polycarbonate produced in these plant components exhibits a certain contamination with fluorescent particles, which is disadvantageous for the quality of injection moldings, extrudates and sheets/films produced from this material.

High, residence times of polycarbonate melts in these plant components are particularly disadvantageous to the product quality and increase the intensity of fluorescence in the material. Polycarbonate melts produced by the melt transesterification process, for example, are in contact with metal surfaces for a prolonged period. This process in particular is therefore critical in terms of the formation of fluorescent particles, which reduce the product quality.

Not only high residence times but also the area of the metal surface coming into contact with the polymer melt plays a serious role. Thus, for example, plant components for the filtration of polycarbonate melts may be critical for product quality since the polycarbonate is exposed to a large area of metal surface. Surface quality is also a factor to be considered, a polished surface is more advantageous than a non-polished.

A process for the treatment of metallic plant components that come into contact with polycarbonate melts has therefore been developed. This process enables a polycarbonate to be produced with a lower content of fluorescent particles, thus distinctly improving the product quality.

In addition to use in optical data storage media, this polycarbonate is also highly suitable for the production of moldings from the automotive glazing sector, such as e.g. diffusers. This polycarbonate is particularly advantageous in those applications in which a good surface quality is required.

It is known that the treatment of steels has an effect on susceptibility to corrosion. Passivation methods are described e.g. by Asami et al. in "Surface and Interface Analysis", 2004, 36(3), 220-224 or by Virtanen et al. in "Material Science Forum" 1995, 185-188 (Passivation of Metals and Semiconductors), 965-974.

None of the publications cited above relates to the treatment of metals that come into contact with polycarbonate melts. The problems of corrosion are not comparable with the requirements of polycarbonate production. The solutions found were not therefore obvious.

It is known that discoloration of the polycarbonate can result from ferrous surfaces in contact with a polycarbonate melt. This is described e.g. in JP 02233733. To solve this problem, low-iron alloys, such as e.g. alloy 59, have been used in combination with polycarbonate melts. This is described e.g. in EP 1222231 B1, WO 2000064554, WO 9954381, WO 2000007684 or in JP 07171873. Apart from the fact that constructions in alloy/Hastelloy are very expensive, so that only partial areas of a plant may ever be built from these materials, none of these publications describes specific treatments of the alloys by means of which the formation of fluorescent particles in polycarbonate melts may be avoided.

In EP 0 410 425 A2, injection moldings made of polycarbonate with a low dust content are described. This is achieved in that certain machine components of the injection molding machine, such as e.g. the screw elements, consist of certain corrosion-resistant materials, such as e.g. Hastelloy. No connection with fluorescent bodies is reported and no treatment method is described.

In JP 2002 12 64 25, a melt filtration plant is described consisting of a stainless steel filter for the reduction of gel particles. No connection with fluorescent bodies is reported and no treatment method of the working surfaces is described.

In EP-A 1156071, a passivation of filter media with weak acids, such as e.g. phenol, is described. As a result, an improvement in the yellowness index of the filtered material is achieved. Fluorescent particles are not described. This method is unsuitable for the reduction of fluorescent particles. In this publication a heat treatment in nitrogen is described, whereas the present invention treats oxidatively.

In U.S. Pat. No. 4,518,440, a process for the passivation of metal surfaces with mineral acids is described. These surfaces, which have a specific chromium oxide and iron oxide content after this process, are generally passivated by the method described. No effects on the formation of fluorescent particles in polycarbonate melts are described. Comparative tests in which polycarbonate melts were treated with iron oxide and/or chromium oxide show that a distinct increase in fluorescence occurs in polycarbonate melts. Taking these results into account, this passivation method is unsuitable for polycarbonate melts.

In JP-4-161210, the coating with chromium oxide of filter media used to filter polymer melts is described. This coating is achieved by a wet chemical process. The effects on the formation of fluorescent particles are not described. A reduction in gel particles is achieved by this method. In contrast, the passivation is achieved here primarily by a thermal process. The passivation according to the invention described here is clearly more effective in terms of the formation of fluorescent particles in PC melts.

In JP 2003048975, the production of polycarbonate in the melt transesterification process is described. In this process, the molten raw materials are subjected to filtration through a passivated filter. This passivation takes place with acid and/or tempering under an inert gas atmosphere. There is no mention of the formation of fluorescent particles. The method described deviates from the method disclosed here since oxidative passivation methods are used here. The filter described in JP 2003048975 is not used for the melt filtration of polycarbonate.

None of the above-mentioned publications deals with the content of fluorescent impurities in polycarbonate. The methods mentioned above do not lead to an effective reduction in fluorescent particles in polycarbonate.

SUMMARY OF THE INVENTION

A process for treating the working surfaces of equipment used in the production and processing of polycarbonate is disclosed. The thermal treatment in an oxidative atmosphere results in resin and molded articles having improved optical quality.

DETAILED DESCRIPTION OF THE INVENTION

Surprisingly, it has been found that a special thermal treatment of stainless steel or stainless steel alloys leads to a significant reduction in fluorescent particles in the polycarbonate matrix. Both in unpassivated stainless steel and stainless steel alloys and in those passivated by acid treatment, this method leads to a distinct reduction in fluorescent particles.

The present invention therefore provides a process for the treatment of metal surfaces that come into contact with the polymer melt during the production or processing of polymers, preferably of polycarbonate, (herein "working surfaces") wherein metal surfaces are thermally treated in an oxidative atmosphere, such as air prior to such production or processing.

The thermal treatment is generally performed at temperatures of 200 to 1200° C., depending on the type of tempering or the corresponding tempering temperature. The duration of the thermal treatment is generally 1 minute to 48 hours, preferably 2 minutes to 30 hours and particularly 10 minutes to 24 hours, and depends on the type of tempering.

This thermal treatment may take place by annealing the metal surface in a flame, by tempering in a muffle furnace by tempering with sand in a fluidized bed or by tempering in a circulating air oven.

When annealing the metal surfaces in a gas flame, the temperatures are generally between 600 and 1500° C., preferably between 800 and 1200° C., when tempering in a muffle furnace, between 300 and 1000° C., preferably between 600 and 900° C., and when tempering in a circulating air oven, 200 to 500° C., preferably 300 to 400° C.

The duration of the thermal treatment at temperatures above 600° C. is generally 1 minute to 1 hour, in the temperature range from 300 to 700° C. usually 30 minutes to 48 hours, preferably 30 minutes to 30 hours, particularly 2 to 25 hours, and at temperatures of 300 to 500° C. generally 1 to 48 hours, preferably 2 to 30 hours, particularly 4 to 25 hours.

The metal parts treated by annealing are heated in a sand bed or fluidised bed.

The metal surfaces of the filter fleece are particularly preferably tempered in a circulating air oven at 200 to 500° C., preferably 250 to 450° C., particularly 300 to 400° C., for up to 35 hours, preferably 4 to 30 hours, particularly 8 to 26 hours. A temperature of 350° C. for 24 hours is especially preferred.

Metal parts that are suitable for the treatment are metal parts the surface of which comes into contact with the polymer melt ("working surface"). These include, for example, pipes, supply tubes, filters and tanks. Further examples are referred to below. The metal parts treated according to the invention should generally be used within 14, preferably 10, particularly preferably 8, especially 3 days after tempering.

Prior to tempering, the metal parts may be cleaned in a suitable manner, e.g. degreased, e.g. by treating with methylene chloride. By treating with mineral acid, particularly nitric acid in concentrations of 0.5-65 wt. %, preferably 5-30 wt. %, at temperatures of 10 to 100° C., preferably at temperatures of 15 to 80° C., and with a treatment time of 10 minutes to 24 hours, preferably 30 minutes to 8 hours, or by phosphoric acid in concentrations of 0.5 to 85 wt. %, preferably 5-40 wt. %, at temperatures of 10 to 150° C., preferably at 15 to 80° C., with treatment times of 10 minutes to 24 hours, preferably 30 minutes to 8 hours, passivation may be achieved. However, it is essential for this to be followed by a thermal treatment step according to the present invention in order to achieve the desired effect.

The metal parts treated according to the invention may be used both in the interfacial polycondensation process and in the melt transesterification process or in the processing of polymers, at points in the production plant wherever metal parts come into contact with the polymer melt. This applies in particular to plant components (sections) which produce high thermal stress, such as concentration units, pumps or heat exchangers.

The filters or filter fleeces treated according to the invention may be used for the so-called deep bed filtration of polycarbonate.

Polymers, particularly polycarbonates, distinguished by a low content of fluorescent particles may be produced in this way.

Thus, polycarbonates produced or processed using metal parts treated according to the invention have a particle count of transparent fluorescent particles with a size of between 15 and 250 μm of 0.1-1.8 counts/g, measured after dissolving the polycarbonate in methylene chloride and filtering it through a Teflon filter with a 5 μm pore size at an excitation wavelength of 400-440 nm and a 25× total magnification with an illumination time of 40 ms.

A contiguous fluorescent area on the Teflon filter is automatically detected here under the conditions stated above (wavelength, total magnification, and illumination time) and counted as 1 count. The individual fluorescent particles found on the Teflon filter are counted. In other words the counted particles may be one particle itself or an area of contiguous clustered particles—both will be counted as one count. The total number of fluorescent particles is divided by the mass of the polycarbonate melt weighed out in the respective batch and the particle count (fluorescent) based on 1 gram polycarbonate (counts/g) is obtained.

The production of the polycarbonates takes place inter alia by the interfacial polycondensation process. This method of polycarbonate synthesis is widely described in the literature: reference may be made, for example, to H. Schnell, Chemistry and Physics of Polycarbonates, Polymer Reviews, vol. 9, Interscience Publishers, New York 1964, pp. 33 ff., to Polymer Reviews, vol. 10, "Condensation Polymers by Interfacial and Solution Methods", Paul W. Morgan, Interscience Publishers, New York 1965, chapter VIII, p. 325, to Drs. U. Grigo, K. Kircher and P. R. Müller "Polycarbonate" in Becker/Braun, Kunststoff Handbuch, volume 3/1, Polycarbonate, Polyacetale, Polyester, Celluloseester, Carl Hanser Verlag Munich, Vienna 1992, pp. 118-145, and to EP-A 0 517 044.

According to this process, the phosgenation of a disodium salt of a bisphenol (or of a mixture of various bisphenols) present in aqueous-alkaline solution (or suspension) takes place in the presence of an inert organic solvent or solvent mixture, which forms a second phase. The resulting oligocarbonates, present mainly in the organic phase, are condensed with the aid of suitable catalysts to form high molecular weight polycarbonates dissolved in the organic phase. The organic phase is finally separated off and the polycarbonate isolated therefrom by various work-up steps.

Diphenols suitable for the production of the polycarbonates to be used according to the invention are e.g. hydroquinone, resorcinol, dihydroxydiphenyl, bis(hydroxyphenyl)-alkanes, bis(hydroxyphenyl)cycloalkanes, bis(hydroxyphenyl)sulfides, bis(hydroxy-phenyl)ethers, bis(hydroxyphenyl)ketones, bis(hydroxyphenyl)sulfones, bis(hydroxyphenyl)sulfoxides, α,α'-bis(hydroxyphenyl) diisopropylbenzenes, and the alkylated, ring-alkylated and ring-halogenated compounds thereof.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)-propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-methylbutane, 1,3-bis[2-(3,5-dimethyl-4-hydroxyphenyl)-2-propyl]benzene, 1-bis(4-hydroxyphenyl) cyclohexane and 1,1-bis(4-hydroxyphenyl)-3,3,5-trimethylcyclohexane (bisphenol TMC) and mixtures thereof.

Particularly preferred diphenols are 4,4'-dihydroxydiphenyl, 1,1-bis(4-hydroxyphenyl)phenylethane, 2,2-bis(4-hydroxyphenyl)propane, 1,1-bis(4-hydroxyphenyl)cyclohexane and 1,1-bis(4-hydroxyphenyl)-3,3,5-trimethylcyclohexane (bisphenol TMC) and mixtures thereof.

These and other suitable diphenols are described e.g. in U.S. Pat. Nos. 2,999,835, 3,148,172, 2,991,273, 3,271,367, 4,982,014 and 2,999,846, in German Offenlegungsschriften 1 570 703, 2 063 050, 2 036 052, 2 211 956 and 3 832 396, the French patent specification 1 561 518, in the monograph "H. Schnell, Chemistry and Physics of Polycarbonates, Interscience Publishers, New York 1964, pp. 28 ff.; pp. 102 ff." and in "D. G. Legrand, J. T. Bendler, Handbook of Polycarbonate Science and Technology, Marcel Dekker New York 2000, pp. 72 ff.".

In the case of homopolycarbonates, only one diphenol is used and in the case of copolycarbonates, several diphenols are used, it being possible, of course, for the bisphenols used, as well as all other chemicals and auxiliary substances added to the synthesis, to be contaminated with the impurities originating from their own synthesis, handling and storage, although it is desirable to work with raw materials that are as clean as possible.

The monofunctional chain terminators required to regulate the molecular weight, such as phenol or alkylphenols, particularly phenol, p-tert.-butylphenol, isooctylphenol, cumylphenol, the chlorocarbonates thereof or acid chlorides of monocarboxylic acids or mixtures of these chain terminators, are either fed into the reaction with the bisphenolate or bisphenolates or added to the synthesis at any point in time, provided that phosgene or chlorocarbonic acid terminal groups are still present in the reaction mixture or, in the case of the acid chlorides and chlorocarbonates as chain terminators, provided that sufficient phenolic terminal groups of the forming polymer are available. Preferably, however, the chain terminator or terminators are added after the phosgenation at a location where or at a time when no more phosgene is present but the catalyst has not yet been metered in, or they are metered in before the catalyst, together with the catalyst or in parallel to the catalyst.

Any branching agents or mixtures of branching agents to be used are added to the synthesis in the same way, but usually before the chain terminators. Trisphenols, quaterphenols or acid chlorides of tri- or tetracarboxylic acids, or mixtures of the polyphenols or acid chlorides, are usually used.

Some of the compounds with three or more phenolic hydroxyl groups that may be used are e.g. phloroglucinol, 4,6-dimethyl-2,4,6-tris(4-hydroxyphenyl)-2-heptene, 4,6-dimethyl-2,4,6-tris(4-hydroxyphenyl)heptane, 1,3,5-tris(4-hydroxyphenyl)benzene, 1,1,1-tris(4-hydroxyphenyl) ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, tetrakis(4-hydroxyphenyl) methane, 3,3-bis(3-methyl-4-hydroxyphenyl)-2-oxo-2,3-dihydroindole.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tris(4-hydroxyphenyl)ethane.

Catalysts used in the interfacial polycondensation synthesis are tert. amines, particularly triethylamine, tributylamine, trioctylamine, N-ethylpiperidine, N-methylpiperidine, N-i/n-propylpiperidine; quaternary ammonium salts such as tetrabutylammonium/tributylbenzylammonium/tetraethylammonium hydroxide/chloride/bromide/hydrogen sulfate/ tetrafluoroborate; as well as the phosphonium compounds corresponding to the ammonium compounds. These compounds are described in the literature as typical interfacial polycondensation catalysts, are commercially available and are familiar to the person skilled in the art. The catalysts may be added to the synthesis individually, as a mixture, or together and successively, optionally also before the phosgenation, although additions after the introduction of phosgene are preferred unless an onium compound or mixtures of onium compounds are used as catalysts, in which case an addition before the metering in of phosgene is preferred. The metering in of the catalyst or catalysts may take place in bulk, in an inert solvent, preferably that of the polycarbonate synthesis, or also as an aqueous solution, and in the case of the tertiary amines, as their ammonium salts with acids, preferably mineral acids, particularly hydrochloric acid. When using several catalysts or when metering in partial quantities of the total quantity of catalyst, different metering methods may of course also be employed at different locations or at different times. The total quantity of the catalysts used is between 0.001 and 10 mole % based on moles of bisphenols used, preferably 0.01 to 8 mole %, particularly preferably 0.05 to 5 mole %.

The polycarbonate synthesis may be carried out continuously or batchwise. The reaction may therefore take place in stirred vessels, tubular reactors, forced circulation reactors or stirred vessel cascades or combinations thereof. Preferred media for these stirred vessels or tubular reactors and pipes etc. are e.g. V4A steel or Hastelloy C.

The polycarbonate solution is washed by repeatedly passing through settling vessels, stirred vessels, coalescers or separators, or combinations of these measures. These plant components also consist of the above-mentioned materials.

The polymer may be isolated from the solution by evaporation of the solvent by means of temperature, vacuum or a heated carrier gas. Other methods of isolation are crystallisation and precipitation. These process steps are also performed in containers made of the above-mentioned media. In a thermal work-up process, particular significance is attached to the material used because of the higher temperature. One such thermal work-up process is e.g. distilling off of the solvent by superheating and pressure release in a so-called "flash process" (cf also "Thermische Trennverfahren", VCH Verlagsanstalt 1988, p. 114). All these processes are described in the patent literature and in text books and are familiar to the person skilled in the art.

When the solvent is removed by temperature (distillation) or the technically more effective flash process, highly concentrated polymer melts are obtained.

From the highly concentrated polymer melts thus obtained, the residues of the solvent may be removed either directly from the melt using evaporation extruders (BE-A 866 991, EP-A 0 411 510, U.S. Pat. No. 4,980,105, DE-A 33 32 065), thin layer evaporators (EP-A 0 267 025), falling film evaporators or strand evaporators, or by friction compaction (EP-A 0 460 450), optionally also with the addition of an entrainer such as nitrogen or carbon dioxide, or using a vacuum (EP-A 0 039 96, EP-A 0 256 003, U.S. Pat. No. 4,423,207). Here too, an important part is played by the material used, which comes into contact with the polymer melt—these materials also consist of the above-mentioned media. In particular, the treatment of the metallic surfaces according to the invention is important in apparatus and pipes at temperatures above 200° C., particularly when these parts are electrically heated or fluid- or steam-heated, especially when the wall temperatures are above 240° C., preferably above 300° C., and the contact time of the surface with the polymer melt is more than 10 seconds, or the temperature difference between incoming melt and heated surface (wall temperature of the metal part) is greater than 60° C. The contact time in concentration steps in the interfacial polycondensation process is usually more than 10 seconds and as a rule less than 20 minutes, preferably less than 15 minutes. The contact time in melt processes is generally 30 minutes to 12 hours, preferably 1 hour to 6 hours.

The use of the surfaces treated according to the invention is also positive when the polymer melt still contains residues of monomers, particularly those with OH or Cl terminal groups, and with a residual content of solvent, particularly chlorinated solvents such as chlorobenzene, dichloromethane, chloroform or carbon tetrachloride and mixtures thereof. The use of the metal surfaces treated according to the invention is therefore particularly advantageous in the area of melt transport paths, thermal concentration steps and thermal mixers, i.e. heated pipes, heat exchangers, flash steps, thin layer evaporators, falling film and tube evaporators, strand evaporators, extruder parts and tanks, where these have wall contact with the PC melt.

Granules are obtained if possible by direct spinning of the melt and subsequent granulation or by using melt extruders by means of which spinning is performed in air or under liquid, usually water. If extruders are used, additives maybe added to the melt upstream of this extruder, optionally using static mixers or by side extruders in the extruder.

In addition, the production of polycarbonates is also possible from diaryl carbonates and diphenols by the known polycarbonate process in the melt, the so-called melt transesterification process, which is described e.g. in WO-A 01/05866 and WO-A 01/05867. In addition, transesterification processes (acetate process and phenyl ester process) are described e.g. in U.S. Pat. Nos. 3,494,885, 4,386,186, 4,661,580, 4,680,371 and 4,680,372, in EP-A 26 120, 26 121, 26 684, 28 030, 39 845, 39 845, 91 602, 97 970, 79 075, 14 68 87, 15 61 03, 23 49 13 and 24 03 01 as well as in DE-A 14 95 626 and 22 32 977.

The continuous process for the production of polycarbonates by the melt transesterification process is preferably characterized in that one or more dihydroxyaryl compounds with the diaryl carbonate, and optionally also other added reactants, using catalysts, after a pre-condensation without separating off the monohydroxyaryl compound formed, in multiple subsequent reaction evaporator stages the molecular weight is built up to the desired level at temperatures that rise stepwise and pressures that fall stepwise.

The devices, apparatus and reactors suitable for the individual reaction evaporator stages are, according to the process sequence, heat exchangers, pressure-relieving apparatus, separators, columns, evaporators, stirred vessels and reactors or other commercially available apparatus providing the necessary residence time at selected temperatures and pressures. The devices selected may be passivated using the process described here By means of a melt filtration of the polycarbonate melt, produced by the melt transesterification process or by the interfacial polycondensation process, the melt may be freed of impurities, such as e.g. foreign particles or cracked polycarbonate. This may involve the melt flowing through simple metal screens with mesh sizes of 10-100 µm. For more effective filtration, deep-bed filtration is suitable using multi-layer thin metal fabrics or sintered metals with pore sizes of 5-40 µm. Filters made of metal fleeces with wires having diameters of 1-10 µm and a pore width of 5 to 40 µm, preferably 5 to 25 µm, are preferred. A melt filtration of this type is described e.g. in EP 1199325.

The following examples explain the invention but are not limiting.

EXAMPLES

Method of Determining the Content of Fluorescent Particles

The analysis of the content of fluorescent particles takes place by filtration of the polycarbonate sample in question (50 g) dissolved in dichloromethane (LiChrosolv; Merck: 1.06044 K33506244 430) (700 ml) through a Teflon filter membrane (Bohlender GmbH, D-97847 Grünsfeld) with a 5 µm pore diameter. The filter discs are dried in vacuo and protected from atmospheric dust by a cover. After filtration, the filter surface is investigated (scanned) by means of an Axioplan 2 fluorescence microscope from Zeiss AG, Germany. Work is carried out with an excitation wavelength of 400-440 nm, an illumination time of 40 ms per scan and a 25× total magnification. The fluorescent particles are detected and the data evaluated using image processing software (KS 300 3.0 from Zeiss AG). Only particles with a characteristic color are counted, i.e. other particles, such as e.g. dust, are not taken into account (determined by the HIS color model—see below). The color parameters for recognising the fluorescent particles are adjusted such that they are the same as the parameters of the particles found in flow defects in optical discs. The scanning of the surface of the filter takes place automatically using a computer-controlled microscope stage (Zeiss AG).

The individual fluorescent particles found on the Teflon filter are enumerated. The total number of fluorescent particles is divided by the mass of the polycarbonate melt weighed out in the respective batch and the particle count (fluorescent) based on 1 gram (counts/g) is obtained.

Depending on the test settings selected, very large fluorescent particles may also form. In order to take account of the size of the particles in the evaluation as well, the particle size density is given as a second value. This value is obtained as follows: the particles are classified into diameter classes in 10

μm bands. The number of particles in a class is added up and multiplied by the diameter (in μm) of this class. By adding up these values over all the diameter classes and dividing by the mass of the polycarbonate melt used, the particle size density (PD) is obtained.

$$c = 1/m \times \sum_i n_i$$

c: particle count in counts/g; m: mass of polymer melt used; $n_i$: particle count in one diameter class $$PD = 1/m \times \sum_{i=0}^{n} n_i \times d_i$$

PD: particle size density in counts*μm/g; $d_i$: diameter of the respective diameter class In order to work out the effect of the metal surface, a stainless steel with a high surface area was used. In these tests, the internal metal fleece from a deep-bed filter suitable for the filtration of polymer melts was used. This was the filter fleece (i.e. the part relevant to the filtration) of a disc filter (Hydac Disc 12-63-M-44-2402107/Mat. 319418) in which only the external filter fleece was used, i.e. the septum and perforated orifice plate were removed. The metal fibres of the filter consist of pressed V4A fibres with diameters of approx. 5-7 μm. The pore size of the filter is approx. 5 μm.

HSI Color Model

The particles are irradiated with light from a mercury vapour lamp and the reflected light is detected through a graded filter with a transmission range above 470 nm. The color of the particles is determined using a digital color camera Axiocam HRc from Zeiss incorporated in an Axioplan 2 microscope from Zeiss according to the HSI (hue, saturation, intensity) color model. This method is described for example in "PC Digital Image Processing" by Hans-Jürgen Schlicht, Addison-Wesley, 1993. If the color of the fluorescent particles is measured at a given illumination setting, an average hue value of about 80°, an average color saturation of 150 digits and an average color intensity of 190 digits is obtained. In the case of (compact disc) polycarbonate the color of the matrix corresponds to a hue value of about 75°, an average color saturation of 133 digits and an average color intensity of 36 digits. The correct color locus of the particles and the matrix is determined by combining the hue, saturation and intensity values.

Reference Example 1

Blank Value/Air

Thermal loading of polycarbonate without the effect of metal 130 g of polycarbonate granules (Makrolon® DP1-1265, Bayer MaterialScience AG) are charged into a 250 ml flask. This flask is immersed in a metal bath preheated to 350° C. in air. The melt is stirred for 1 hour using a KPG stirrer (glass stirrer). The stirring rate is selected such that the melt does not rise up the stirrer. After the specified time, the polycarbonate melt is poured into an aluminium bowl.

50 g of the solidified melt thus obtained are dissolved in 700 ml dichloromethane (LiChrosolv; Merck: 1.06044) and filtered through a Teflon filter membrane (Bola filter membrane, 5 μm pore diameter; filter membrane thickness: 1 mm, Bohlender GmbH, D-97847 Grünsfeld). The evaluation of the particles retained on the filter takes place as described above using automatic detection with a fluorescence microscope. The result of the fluorescence measurement obtained is 0.68 counts/g.

The result of the investigation is shown in Table 1.

Reference Example 2

Blank Value/Ar

The procedure of reference example 1 is followed, but working under argon. The number of fluorescent particles is then evaluated. The result of the fluorescence measurement obtained is 1.03 counts/g (cf Table 1).

Comparative Example 3

With Unpassivated Metal in Air 130 g of polycarbonate granules (Makrolon® DP1-1265, Bayer MaterialScience AG), which have been dried in vacuo for approx. 4 hours at 120° C., are charged into a 250 ml flask. A strip of metal (metal from a disc filter: Hydac Disc 12-63-M-44-2402107/Mat. 319418, cut to 48×11×1 mm; only the external filter fleece which is effective for the filtration is used, the septum and "perforated plate" are removed; the filter strip was degreased with methylene chloride before use and then dried under high vacuum) is attached to a glass stirrer, which is provided at its lower end with a glass loop, with the aid of the eyelet and is bent round. This flask is immersed in a metal bath preheated to 350° C. in air. The melt is stirred for 1 hour using a KPG stirrer to which the glass stirrer provided with the metal is attached. The stirring rate is selected such that the melt does not rise up the stirrer. After the specified time, the polycarbonate melt containing the piece of metal filter is poured into an aluminium bowl.

The result of the fluorescence measurement obtained is more than 140 counts/g (cf. Table 1).

Comparative Example 4

With Unpassivated Metal under Ar

The test was performed as in example 3, but the melt was stirred under a protective gas atmosphere (argon).

The result of the fluorescence measurement obtained is 112.39 counts/g (cf. Table 1).

Example 5

With Passivated Metal in Air—According to the Invention

The test was performed as in example 3, but the metal strip was treated as follows: the metal was degreased with methylene chloride and dried in vacuo. The metal is then tempered in a circulating air oven at 350° C. for 24 hours. The metal strip was used immediately after drying.

The result of the fluorescence measurement obtained is 1.45 counts/g (cf. Table 1). The result of the fluorescence measurement shows that significantly fewer fluorescent particles are formed as a result of the treatment according to the invention.

Example 6

With Passivated Metal under Argon—According to the Invention

The metal strip was treated as described in example 5. The metal strip treated in this way is then treated according to example 3 in the polymer melt under argon (instead of air) in the flask.

The result of the fluorescence measurement obtained is 1.59 counts/g (cf. Table 1).

The result shows that significantly fewer fluorescent particles are formed as a result of the treatment according to the invention.

The following tests show that the treatment of filter metal parts leads to a marked reduction in fluorescent particles in polycarbonate compared with the passivation of filter metal parts without treatment of the metal parts according to the invention:

Comparative Example 7

Passivation of the Metal in Citric Acid

Before contact with the polycarbonate melt, the metal is treated with 10% citric acid at 50° C. for 1 hour and then rinsed well with water and subsequently dried. The metal is not treated according to the invention. The tempering of the metal in the polymer melt takes place in air as described in example 3.

The result of the fluorescence measurement obtained is 46.33 counts/g (cf. Table 1).

This result of the fluorescence measurement shows that a passivation corresponding to the prior art is markedly inferior to the method according to the invention.

Comparative Example 8

Passivation with Phenol

Before being tempered in the polycarbonate melt, the metal is treated with phenol at 100° C. for 1 hour. The metal is not treated according to the invention. The tempering in the polymer melt takes place in air as described in example 5.

The result of the fluorescence measurement obtained is 61.09 counts/g (cf. Table 1).

This result shows that a passivation corresponding to the prior art is markedly inferior to the method according to the invention.

Comparative Example 9

Comparative Test—Passivation with HNO3

Before being tempered in the polycarbonate melt, the metal fleece is treated in nitric acid (20%) at 80° C. for one hour (a water jet vacuum is applied several times to degas the metal completely and to wet it with the passivation solution). After the treatment with nitric acid, the metal fleece is washed until neutral and rinsed with Millipore water several more times and then dried in a high vacuum. The metal is not treated according to the invention. The tempering in the polymer melt takes place in air as described in example 3.

The result of the fluorescence measurement obtained is 89.86 counts/g (cf. Table 1).

Comparative Example 10

Passivation According to JP 2001-026452

The degreased metal fleece is treated as follows before being tempered in the polycarbonate melt:

A solution of 15 g sodium hydroxide, 3 g sodium phosphate, 2 g sodium nitrite, 2 g lead(VI) oxide and 0.1 g iron hydroxide (FeO(OH)) in 78 ml water is heated to reflux. The metal filter fleece is treated in this solution for 15 minutes. After washing with water until neutral, it is rinsed several more times with Millipore water. The metal is not treated according to the invention.

The tempering in the polymer melt takes place in air as described in example 3. The result of the fluorescence measurement obtained is 85.85 counts/g.

Example 11

Comparative Test—Passivation According to U.S. Pat. No. 4,518,440

A degreased metal filter fleece is treated as follows before being tempered in the polycarbonate melt:

The filter fleece is stored in a circulating air oven for 5 hours at 510° C. The metal is then treated with a passivation solution, which is prepared as follows:

2.5 g anhydrous oxalic acid, 1.3 g 30% hydrogen peroxide solution and 0.1 g concentrated sulfuric acid are dissolved in 100 ml demineralised water.

The filter fleece is treated in this solution at 60° C. for 30 minutes, with stirring.

The filter fleece is then rinsed thoroughly with water and dried. The metal is not treated according to the invention.

The tempering in the polymer melt takes place in air as described in example 3.

The result of the fluorescence measurement obtained is 3.99 counts/g. Moreover, the particles formed are distinctly larger compared with the test in which the metal fleece was treated according to the invention (cf Table 1).

Comparative Example 12

Filter in Static Melt; Unpassivated

Pieces measuring 15 mm×15 mm×2 mm are cut from a filter pack (disc filter: Hydac Disc 12-63-M-44-2402107/Mat. 319418 with a 5 μm pore size).

The pieces measuring 15 mm×15 mm×2 mm were placed on a suction filter and a chlorobenzene/methylene chloride mixture (1:1, 200 ml) was drawn through the filter with a water jet vacuum for degreasing purposes. The piece of filter fleece is then dried for 5 min at 200° C. in a drying cabinet.

The piece of filter fleece is then placed together with 30 g of dried (12 h, 120° C., water jet vacuum) polycarbonate granules (Bayer MaterialScience AG, Makrolon® DPI-1265) in a 50 ml one-neck flask and the atmosphere in the flask is exchanged for nitrogen (evacuated and gassed with nitrogen 3 times). The flask is then heated up to 340° C., together with its contents, in a metal bath. Subsequently, the temperature is kept at 340° C. for 20 minutes, evacuation is then performed with a water jet vacuum at this temperature and the temperature is kept at 340° C. for 20 minutes with a water jet vacuum, the flask is then gassed with nitrogen and kept at 340° C. for a further 50 minutes and subsequently cooled. In total, the polycarbonate melt is therefore tempered with the filter fleece at 340° C. for 90 minutes.

The filter fleece is removed before the polycarbonate melt solidifies. The polycarbonate melt is dissolved in methylene chloride and the fluorescent portions are determined according to the method described.

Comparative Example 13

Static Melt; Filter Fleece Passivated with $H_3PO_4$

After being degreased, the piece of filter fleece was passivated for 30 min with 85% phosphoric acid at 100° C., rinsed with water, dried and then used as described in example 12. The metal is not treated according to the invention. The fluorescent portions are determined according to the method described. The result is shown in Table 2.

Comparative Example 14

Static Melt; Filter Fleece Passivated with $HNO_3$)

After being degreased, the piece of filter fleece was passivated for 30 min with 65% nitric acid at 100° C., rinsed with water, dried and then used as described in example 12. The metal is not treated according to the invention.

The fluorescent portions are determined according to the method described. The result is shown in Table 2.

Example 15

Static Melt; According to the Invention, Burning Out of an "Unpassivated Filter Fleece"

The piece of filter fleece taken from a test corresponding to example 12 is burnt out in a Bunsen burner flame for 5 min, cooled and used in a similar test (as in example 12 after the degreasing and drying). The fluorescent portions are determined according to the method described. The result is shown in Table 2.

Example 16

Static Melt; According to the Invention

Burning out of a "filter fleece passivated with $H_3PO_4$"

The piece of filter fleece treated with phosphoric acid a test corresponding to example 13 is burnt out in a Bunsen burner flame for 5 min, cooled and used in a similar test (as in example 12 after the degreasing and drying). The fluorescent portions are determined according to the method described. The result is shown in Table 2.

Example 17

Static Melt; According to the Invention

Burning out of a "filter fleece passivated with $HNO_3$"

The piece of filter fleece treated with nitric acid a test corresponding to example 14 is burnt out in a Bunsen burner flame for 5 min, cooled and used in a similar test (as in example 12 after the degreasing and drying). The fluorescent portions are determined according to the method described. The result is shown in Table 2.

Example 18

According to the Invention

Annealing of a "non-treated filter fleece"

The piece of filter fleece taken from a test corresponding to example 12 is annealed in a muffle furnace for 10 minutes at 800° C., cooled and used in a similar test (as in example 12 after the degreasing and drying). The fluorescent portions are determined according to the method described. The result is shown in Table 2.

Example 19

According to the Invention

Annealing of a "filter fleece passivated with $H_3PO_4$"

The piece of filter fleece treated with phosphoric acid a test corresponding to example 13 is annealed in a muffle furnace for 10 minutes at 800° C., cooled and used in a similar test (as in test 12 after the degreasing and drying). The fluorescent portions are determined according to the method described. The result is shown in Table 2.

Example 20

According to the Invention

Annealing of a "filter fleece passivated with $HNO_3$"

The piece of filter fleece treated with nitric acid a test corresponding to example 14 is annealed in a muffle furnace for 10 minutes 800° C., cooled and used in a similar test (as in example 12 after the degreasing and drying). The fluorescent portions are determined according to the method described. The result is shown in Table 2.

Reference Example 21

Blank Value without Metal

This example corresponds to example 12, but no filter fleece is added to the polycarbonate melt.

TABLE 1

| | | Metal filter in polycarbonate melt (stirred) | | |
|---|---|---|---|---|
| Ex. | Description | Implementation | Particle count (fluorescent) | Particle size density counts · μm/g |
| 1 | Blank value | 350° C./air/no metal | 0.68 counts/g | 30.5 |
| 2 | Blank value | 350° C./argon/no metal | 1.03 counts/g | 44.6 |
| 3 | Comparative test | 350° C./air/with metal (not passivated) | >140 counts/g | 16815.2 |

TABLE 1-continued

Metal filter in polycarbonate melt (stirred)

| Ex. | Description | Implementation | Particle count (fluorescent) | Particle size density counts · μm/g |
|---|---|---|---|---|
| 4 | Comparative test | 350° C./argon/with metal (not passivated) | 112.39 counts/g | 12079.1 |
| 5 | According to the invention | 350° C./air/with metal (passivated) | 1.45 counts/g | 73.6 |
| 6 | According to the invention | 350° C./argon/with metal (passivated) | 0.91 counts/g | 31.5 |
| 7 | Comparative test | 350° C./air/with metal (passivated according to prior art) citric acid | 46.33 counts/g | 6086.1 |
| 8 | Comparative test | 350° C./air/with metal (passivated according to prior art) phenol | 61.09 counts/g | 6177.9 |
| 9 | Comparative test | 350° C./air/with metal (passivated according to prior art) HNO3 | 89.86 counts/g | 10948 |
| 10 | Comparative test | 350° C./air/with metal (passivated according to JP 2001-026542 | 85.85 counts/g | 12779.6 |
| 11 | Comparative test | 350° C./air/with metal (passivated according to US-A 4,518,440) | 3.99 counts/g | 477.1 |

The results show that the method according to the invention leads to a significantly lower formation of fluorescent fisheyes. The values resulting from the process according to the invention are no higher, or only slightly higher, compared with a tempering of polycarbonate that has not been in contact with a metal surface. This means that the method according to the invention is an effective method of avoiding the formation of fluorescent fisheyes. All other treatment methods according to the prior art are clearly less effective where the formation of fluorescent particles is concerned.

TABLE 2

Metal filter in polycarbonate melt (not stirred)

| Example | Description | Description | Particle count (fluorescent) (counts/g PC) |
|---|---|---|---|
| 12 | Comparative test | Unpassivated filter fleece | 60.4 |
| 13 | Comparative test | Filter fleece passivated with $H_3PO_4$ | 63.3 |
| 14 | Comparative test | Filter fleece passivated with $HNO_3$ | 81.5 |
| 15 | According to the invention | Filter fleece burnt out in a Bunsen burner flame for 5 min | 1.4 |
| 16 | According to the invention | Burning out of a filter fleece passivated with $H_3PO_4$ | 0.4 |
| 17 | According to the invention | Burning out of a filter fleece passivated with $HNO_3$ | 0.2 |
| 18 | According to the invention | Annealing of an unpassivated filter fleece | 2.2 |
| 19 | According to the invention | Annealing of a filter fleece passivated with $H_3PO_4$ | 0.7 |
| 20 | According to the invention | Annealing of a filter fleece passivated with $HNO_3$ | 1.2 |
| 21 | Blank value | Without addition of a filter strip | 0.7 |

The results clearly show that it is not the passivation using phosphoric or nitric acid that causes a significant reduction in fluorescent particles, but the thermal treatment using a Bunsen burner flame or muffle furnace. A metal passivated with mineral acid can, however, obtain a passivation favorable for polycarbonate by means of a further thermal treatment.

The different values between examples in which the polymer melt was stirred compared with those in which the polymer melt was in stationary contact with the metal are explained by the different methods (flushing of the filter).

The invention claimed is:
1. In the process of preparing equipment for producing polycarbonate resin the improvement comprising subjecting at least some of the working surface of said equipment to thermal treatment in an oxidative atmosphere.
2. The process of claim 1 wherein the thermal treatment is at temperatures of 200 to 1200° C.
3. The process of claim 1 wherein said surface is treated with mineral acid prior to said treatment.
4. The process of claim 1 wherein the working surface is of a stainless steel filter.
5. The process of claim 1 wherein said working surface is that of at least one member selected from the group consisting of pipe, tank and extruder.
6. In the process of preparing equipment for processing polycarbonate resin the improvement comprising subjecting at least some of the working surface of said equipment to thermal treatment in an oxidative atmosphere.

7. The process of claim 6 wherein the thermal treatment is at temperatures of 200 to 1200° C.

8. The process of claim 6 wherein said surface is treated with mineral acid prior to said treatment.

9. The process of claim 6 wherein the working surface is of a stainless steel filter.

10. The process of claim 6 wherein said working surface is that of at least one member selected from the group consisting of pipe, tank and extruder.

* * * * *